(12) United States Patent
Sedaghat Amoli et al.

(10) Patent No.: US 11,833,969 B2
(45) Date of Patent: Dec. 5, 2023

(54) DYNAMIC VEHICLE MIRROR ADJUSTMENT

(71) Applicant: Volvo Car Corporation, Gothenburg (SE)

(72) Inventors: Alborz Sedaghat Amoli, Gothenburg (SE); Eric Tobias Öhrström, Gothenburg (SE); Thilak Rathinavelu, Gothenburg (SE); Alvaro Rodrigo Alonso, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 811 days.

(21) Appl. No.: 16/742,774

(22) Filed: Jan. 14, 2020

(65) Prior Publication Data
US 2021/0213879 A1    Jul. 15, 2021

(51) Int. Cl.
*B60R 1/25*  (2022.01)
*B60R 1/02*  (2006.01)
*G06F 3/0484* (2022.01)
*G06F 3/0487* (2013.01)

(52) U.S. Cl.
CPC ............ *B60R 1/025* (2013.01); *G06F 3/0484* (2013.01); *G06F 3/0487* (2013.01); *B60R 2300/20* (2013.01); *B60R 2300/50* (2013.01); *B60R 2300/80* (2013.01)

(58) Field of Classification Search
CPC ............... B60R 1/025; B60R 2300/20; B60R 2300/50; B60R 2300/80; G06F 3/0484; G06F 3/0487
See application file for complete search history.

(56) References Cited

U.S. PATENT DOCUMENTS

| | | |
|---|---|---|
| 5,022,747 A | 6/1991 | Polanyi et al. |
| 6,176,587 B1 | 1/2001 | Fredricks |
| 8,087,791 B2 | 1/2012 | Okuda et al. |
| 8,200,397 B2 | 6/2012 | Ryu et al. |
| 8,297,763 B2 | 10/2012 | Lee et al. |
| 8,702,250 B2 | 4/2014 | Raz et al. |
| 8,926,105 B2 | 1/2015 | Verheyden |
| 9,598,015 B1 | 3/2017 | Pertsel et al. |

(Continued)

OTHER PUBLICATIONS

"Stop auto-adjusting mirrors in reverse," Tesla Forum: Discussion in Model X: Driving Dynamics, Jan. 21, 2018, 6 pp. retrieved from: https://teslamotorsclub.com/tmc/threads/stop-auto-adjusting-mirrors-in-reverse.106878/.

(Continued)

*Primary Examiner* — Daniel T Tekle
(74) *Attorney, Agent, or Firm* — Shumaker & Sieffert, P.A.

(57) ABSTRACT

In general, techniques are described by which a computing system dynamically and automatically adjusts an orientation of one or more mirrors of a vehicle. A computing system includes at least one processor and memory. The memory includes instructions that, when executed, cause the at least one processor to determine a current orientation of a mirror of a vehicle and determine a preferred orientation of the mirror based upon a set of data points. Execution of the instructions also causes the at least one processor to output a command to adjust the mirror to the preferred orientation in response to determining the current orientation is not the preferred orientation.

18 Claims, 6 Drawing Sheets

(56) References Cited

U.S. PATENT DOCUMENTS

| | | |
|---|---|---|
| 10,210,761 B2 | 2/2019 | Rau et al. |
| 2007/0263301 A1 | 11/2007 | Agrest |
| 2010/0177413 A1* | 7/2010 | Lee .................... B60R 1/025 |
| | | 359/843 |
| 2015/0092056 A1* | 4/2015 | Rau .................... B60R 11/04 |
| | | 348/148 |
| 2017/0158135 A1 | 6/2017 | Ding |
| 2017/0305349 A1 | 10/2017 | Naboulsi |

OTHER PUBLICATIONS

Rho et al., "Automatic mirror adjustment system using a driver's pupils," IEEE Intelligent Vehicle Symposium, vol. 1, Jun. 2002, 8 pp.

* cited by examiner

DYNAMIC VEHICLE MIRROR ADJUSTMENT

TECHNICAL FIELD

This disclosure relates to vehicles, and more particularly, vehicle mirrors.

BACKGROUND

Vehicles typically include a plurality of mirrors, such as two or more side mirrors and a center rear-view mirror. A driver of a vehicle may manually set a position of each mirror to set a field of view reflected by each respective mirror. A vehicle computing device may store data indicating a preferred seat position and a preferred mirror orientation for one or more different drivers. If the driver changes his or her seat position (e.g., up, down, back, or forward), the field of view provided by one or more of the mirrors changes.

SUMMARY

In general, the disclosed subject matter relates to techniques for enabling a vehicle computing device to dynamically and automatically adjust one or more mirrors of a vehicle to maintain a similar field of view. The computing device calibrates the mirrors by determining an orientation of one or more mirrors for one or more driver positions. For example, the driver may set his or her seat to a first reference position and may adjust the orientation of each mirror to provide a respective field of view. The computing device determines a reference orientation of each mirror when the mirror is providing the desired field of view and the driver is located at a first reference position. If the driver's position changes, the computing device determines an preferred orientation for each mirror to cause the mirror to provide a similar field of view, and outputs a command to re-orient each mirror to the preferred orientation. Automatically adjusting the orientation of the mirrors to provide a similar field of view when the driver's position changes may improve the driver's ability to see his or her surroundings, which may increase safety of the occupants of the vehicle and people in proximity to the vehicle, as well as reducing risk of damage to the vehicle and/or other objects.

The computing device may output a graphical user interface (GUI) that displays the field of view for each of the mirrors. The user may adjust the field of view of one or more mirrors by performing a gesture, such as tapping on a display device that displays the GUI. The computing device updates the GUI to provide the updated field of view for each mirror. If the driver accepts the updated field of view, the computing device automatically adjusts the orientation of the mirrors to provide the updated field of view. Displaying the field of view via a display device may enable the driver to more easily visualize and set the field of view. Automatically adjusting the orientation of the mirrors may increase visibility of the driver's surroundings, thereby potentially increasing safety of people and objects within and around the vehicle.

In one example, a device includes at least one processor and a memory comprising instructions that, when executed, cause the at least one processor to determine a current orientation of a mirror of a vehicle; determine a preferred orientation of the mirror based on 1) a current driver position of a driver of the vehicle, 2) a difference between a first reference driver position for the driver and a second reference driver position for the driver, and 3) a difference between a first reference orientation of the mirror when the driver is positioned at the first reference driver position and a second reference orientation when the driver is positioned at the second reference driver position; and responsive to determining the current orientation is not the preferred orientation, output a command to adjust the mirror to the preferred orientation.

In another example, a non-transitory computer-readable storage medium stores instructions that, when executed by one or more processors, cause the one or more processors to determine a current orientation of a mirror of a vehicle; determine a preferred orientation of the mirror based on 1) a current driver position of a driver of the vehicle, 2) a difference between a first reference driver position for the driver and a second reference driver position for the driver, and 3) a difference between a first reference orientation of the mirror when the driver is positioned at the first reference driver position and a second reference orientation when the driver is positioned at the second reference driver position; and responsive to determining the current orientation is not the preferred orientation, output a command to adjust the mirror to the preferred orientation.

In another example, a method includes determining a current orientation of a mirror of a vehicle; determining a preferred orientation of the mirror based on 1) a current driver position of a driver of the vehicle, 2) a difference between a first reference driver position for the driver and a second reference driver position for the driver, and 3) a difference between a first reference orientation of the mirror when the driver is positioned at the first reference driver position and a second reference orientation when the driver is positioned at the second reference driver position; and responsive to determining the current orientation is not the preferred orientation, outputting a command to adjust the mirror to the preferred orientation.

In another example, a device includes means for determining a current orientation of a mirror of a vehicle; means for determining a preferred orientation of the mirror; and means for adjusting the mirror to the preferred orientation in response to determining the current orientation is not the preferred orientation.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
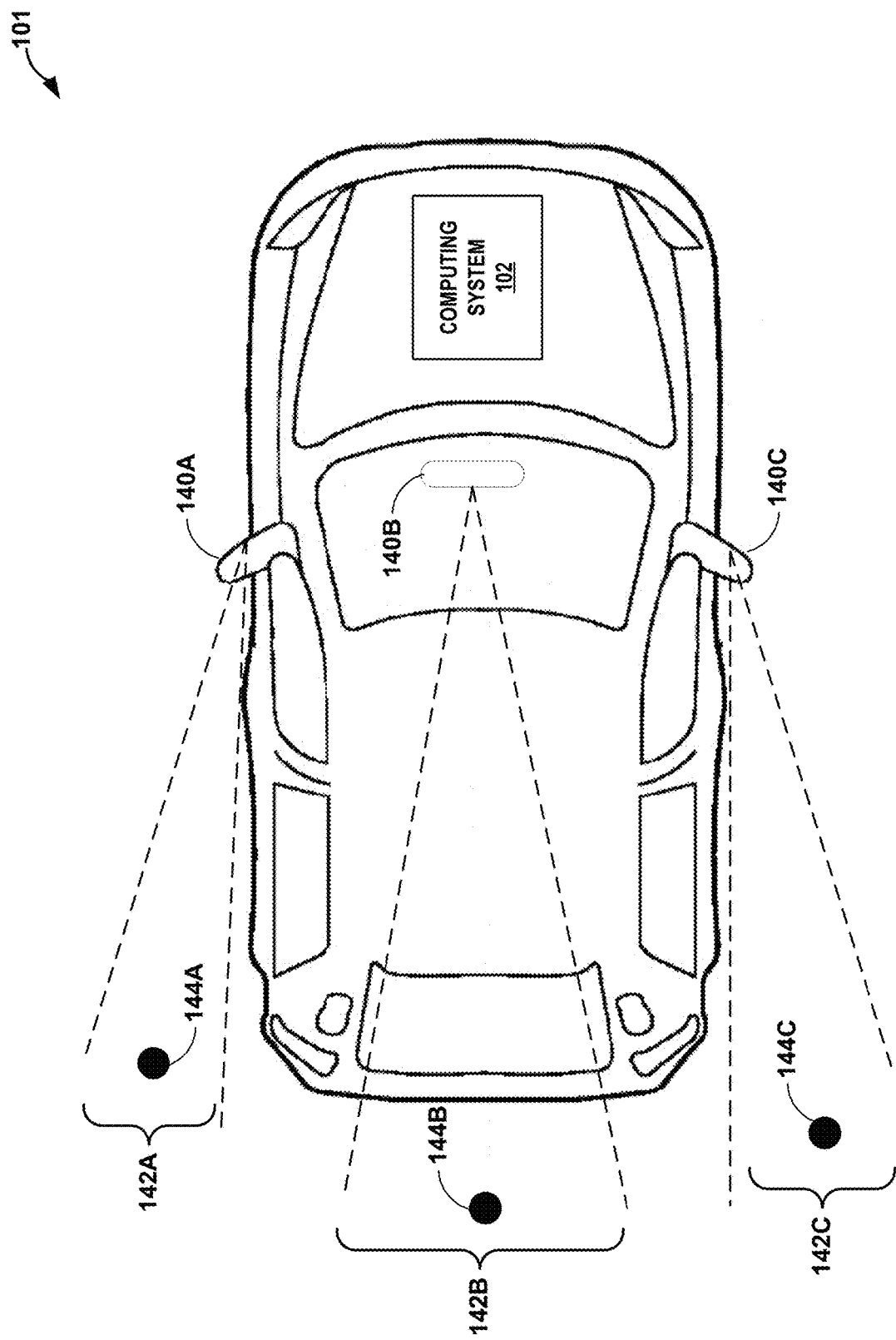
FIG. 1 is a block diagram illustrating an example vehicle that dynamically adjusts the mirrors of the vehicle, in accordance with one or more aspects of the present disclosure.

FIG. 1 is a conceptual block diagram illustrating an example vehicle 101 that dynamically adjusts the mirrors of the vehicle to maintain a constant or near constant field of view, in accordance with one or more aspects of the present disclosure. Vehicle 101 may include any type of autonomous, semi-autonomous, or non-autonomous vehicle. Examples of vehicle 101 include cars, trucks, buses, motorcycles, recreational vehicles (RVs), tractors, all-terrain vehicles, watercraft, or any other type of vehicle.

Vehicle 101 includes a plurality of mirrors 140A, 140B, and 140C (collectively, mirrors 140). Mirrors 140 are configured to reflect the environment exterior to vehicle 101. Mirrors 140A, 140C include side mirrors configured to reflect the environment exterior to the left and right of vehicle 101, respectively. In the example of FIG. 1, mirror 140B is a center rear-view mirror that is configured to reflect the environment behind vehicle 101. Mirrors 140 may include plane or flat mirrors, convex mirrors, aspheric mirrors, or a combination therein. Mirrors 140A, 140B, and 140C each provide a respective field of view 142A, 142B, and 142C (collectively, fields of view 142). Mirrors 140 include at least one motor configured to adjust the orientation of each respective mirror in a horizontal and/or vertical direction. Mirrors 140 may include position sensors to determine the horizontal and/or vertical position of each respective mirror 140.

Vehicle 101 includes computing system 102. Computing system 102 includes one or more processing units, which may be implemented as one or more fixed-function hardware processing circuits, one or more programmable hardware processing circuits, or a combination thereof. Fixed-function circuits refer to circuits that provide particular functionality and are pre-set on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

In accordance with techniques of this disclosure, computing system 102 dynamically adjusts the orientation of each mirror 140 to maintain a field of view based on the current position of the driver of vehicle 101 and mirror calibration data for each mirror 140. Computing system 102 may perform a calibration operation for each mirror 140 by determining a reference orientation of each mirror 140 when the driver is located at a first reference driver position.

In some instances, the first reference driver position is defined by the position of the driver's head. In another instance, the first reference driver position is defined by the position of the driver's seat. Computing system 102 may determine the first reference driver position based on data from one or more sensors. For example, computing system 102 may receive image data from one or more cameras within vehicle 101 (e.g., within rear view mirror 140B) and determine the position of the driver (e.g., the position of the driver's head) based on the image data. In another example, computing system 102 may receive sensor data from one or more seat position sensors indicating a vertical position of the driver's seat, a horizontal position of the driver's seat, and/or a tilt (also referred to as a recline) of the driver's seat.

In one instance, the driver's seat may be located at a limit of the seat's movement when the driver's seat is located at the first reference driver position. As one example, the driver's seat may be located at a horizontal limit, a vertical limit, and/or a tilt limit when the driver's seat is located at the first reference driver position. The horizontal limit may be the position at which the seat is moved as far forward or as far backward as possible. The vertical limit may be the position at which the seat is located as high as possible or as low as possible. A tilt limit may be the position at which the seat is tilted as far forward or as far backwards as possible.

The driver of vehicle 101 may orient mirrors 140 to provide a respective field of view 142 when the driver is positioned at the first reference driver position. Computing system 102 determines a first reference orientation of mirrors 140 when the driver is located at the first reference driver position. For example, computing system 102 may receive position data from each of the position sensors of mirrors 140 indicating the vertical and/or horizontal position of each mirror 140 when the driver is located in the first reference driver position. In one example, the position data indicates the amount of tilt and/or pan of each mirror 140.

Computing system 102 may determine a field of view 142 for each of mirrors 140 when the mirror is oriented in the first reference orientation and the driver is located in the first reference driver position. In one example, computing system 102 determines a center of each field of view 142. For example, computing system 102 may determine that locations 144A, 144B, and 144C are in the center of each of fields of view 142A, 142B, and 142C, respectively.

In some examples, computing system 102 determines a second reference orientation for mirrors 140 when the driver is located at a second reference driver position during the calibration operation. In some examples, the second reference driver position is defined by the position of the driver's head and/or the position of the driver's seat, as discussed above. The driver of vehicle 101 may re-orient one or more of mirrors 140 (e.g., mirror 140A) to maintain the same or similar (e.g. substantially similar) field of view when the driver is located at the second reference driver position. In other words, the driver may re-orient mirror 140A such that mirror 140A provides a second field of view that is substantially similar to a first field of view provided by mirror 140A. In one example, the first field of view is substantially similar to the second field of view when the first field of view includes a threshold portion (e.g., 70%, 80%, 85%) of the second field of view.

Responsive to performing the calibration operation, computing system 102 may store mirror calibration data indicating the reference orientation of each mirror for each reference driver position. The mirror calibration data includes data indicating the first reference driver position (e.g., the position of the driver's head and/or the seat position) and reference orientation of each mirror 140 associated with the first reference driver position. The mirror calibration data may include data indicating the second reference driver position and the orientation of each mirror 140 associated with the second reference driver position. In some examples, the mirror calibration data includes data indicating each field of view 142 for each reference driver position and associated mirror reference orientation. In some examples, the mirror calibration data includes data identifying the driver and the reference orientations and reference driver positions for each driver. In this way, computing system 102 may store data customized data for each driver and may dynamically adjust the orientation of mirrors 140 to provide a field of view preferred by each respective driver of vehicle 101 when the driver position changes.

After calibrating mirrors 140, the driver position may change. For example, the driver may move his or her seat at some time after performing the calibration operation (e.g., a day later, a week later, a month later, etc.) or the driver may move within his or her seat. When the driver position changes, mirrors 140 may no longer provide a field of view preferred by the driver.

Computing system 102 may determine whether to adjust mirrors 140, for example, by determine whether the current orientation of mirrors 140 is a preferred orientation of the mirror for the current driver position. Computing system 102 may determine a current driver position based on sensor data from a seat position sensor and/or an image sensor. Similarly, computing system 102 may determine a current mirror orientation based on position data from mirror position sensors. Computing system 102 determines the preferred orientation of the mirror for the current driver position based on the mirror calibration data. In one example, computing system 102 determines the preferred orientation of the mirror based on the current driver position, a single (e.g., first) reference driver position, and a single (e.g., first) reference orientation of the mirror when the driver is positioned at the single reference driver position.

In another example, computing system 102 determines the preferred orientation of the mirror based on 1) the current driver position, 2) a difference between the first reference driver position and the second reference driver position, and 3) a difference between the first reference orientation of the mirror when the driver is positioned at the first reference driver position and the second reference orientation when the driver is positioned at the second reference driver position. In such examples, computing system 102 may determine the preferred orientation of mirrors 140 by interpolating between the reference orientation of mirrors 140 at the first reference driver position, the orientation of mirrors 140 at the second reference driver position, and the current driver position. In some instances, the preferred orientation of mirrors 140 may cause mirrors 140 to provide a field of view that is substantially similar to the driver's preferred field of view. For instance, the field of view provided by mirror 140A when mirror 140A is oriented according to the preferred orientation may include at least a threshold portion (e.g., 75%, 85%, 90%) of the field of view provided by mirror 140A when mirror 140A is oriented according to the first reference orientation and the driver is positioned at the first reference driver position, and at least a threshold portion of the field of view provided by mirror 140A when mirror 140A is oriented according to the second reference orientation and the driver is positioned at the second reference driver position.

Responsive to determining the preferred orientation of mirrors 140, computing system 102 may automatically set each of mirrors 140 to the respective preferred orientations. For example, computing system 102 may output a command to control a motor or actuator that adjusts the orientation (e.g., tilt and/or pan) of each mirror 140. In this way, computing system 102 may dynamically adjust the orientation of the mirrors to provide substantially the same field of view as the driver position changes (e.g., if the driver re-positions his or her seat). Automatically adjusting the orientation of the mirrors may assist the driver in reducing or eliminating blind spots, which may reduce the risk of collisions and potentially increasing safety of the occupants of vehicle 101 and people in proximity to vehicle 101.

In some examples, vehicle 101 includes an infotainment system that includes a display device (e.g., located at a center console of vehicle 101). Computing system 102 may output a graphical user interface (GUI) via the display device. In one example, the GUI provides a 360-degree view of vehicle 101, the field of view 142 for each respective mirror 140, and a respective center location 144 of each field of view 142.

Vehicle 101 may receive a user input selecting a new field of view 142 for one or more mirrors 140. For example, the driver of vehicle 101 may adjust the field of view by performing a user input (e.g., a gesture, such as a tap, pinch, drag, etc.) on the GUI to move the field of view. In one example, computing system 102 receives data indicative of the user input and determines the updated field of view 142 based on the user input. For example, when the user input is a tap, computing system 102 may set the center location 144A of the field of view 142A at the location indicated by the tap. In such examples, computing system 102 may determine an updated orientation of mirror 140A based on the updated center location 144A of field of view 142A. Responsive to determining the updated orientation of mirror 140A, computing system 102 may update the GUI to display the updated fields of view 142. Additionally or alternatively, computing system 102 may output a command to adjust the orientation of mirror 140A in response to determining the updated orientation of mirror 140A. In some scenarios, computing system 102 updates the mirror calibration data to set one of the reference driver positions to the current driver position (or add the current driver position as a reference driver position) and set the reference orientation to be the updated orientation of mirror 140A (or add the updated orientation as a reference orientation).

Providing a 360-degree view of vehicle 101 and the fields of view 142 of mirrors 140 may enable the driver to easily ascertain his or her entire field of view on the display device. Enabling the driver to adjust the fields of view 142 via the display device and displaying the updated fields of view 142 on a single screen (e.g., rather than manually checking the fields of view in each of mirrors 140) may enable the driver to more visualize the cumulative field of view across all of mirrors 140 and adjust the individual fields of view, which may assist the driver in reducing or eliminating blind spots. In this way, computing system 102 may increase the safety of the occupants of vehicle 101 and other people nearby, while potentially reducing the risk of damage to vehicle 101 or nearby objects.

Figure 2:
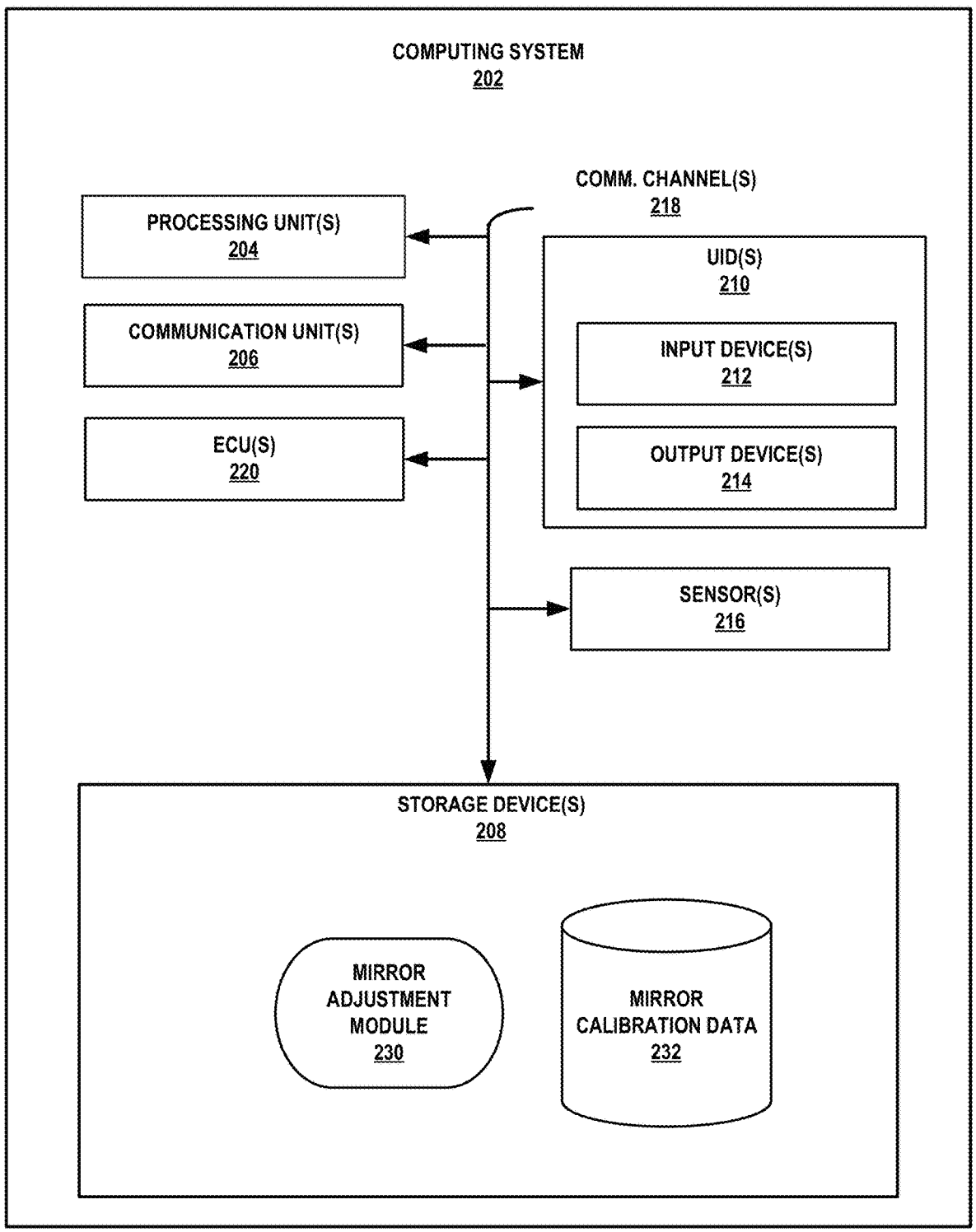
FIG. 2 is a block diagram illustrating an example vehicle computing system that dynamically adjusts the mirrors of a vehicle, in accordance with one or more aspects of the present disclosure.

FIG. 2 is a block diagram illustrating an example vehicle computing system that dynamically adjusts the mirrors of a vehicle, in accordance with one or more aspects of the present disclosure. Computing system 202 is a more detailed example of computing system 102 of FIG. 1. As illustrated in FIG. 2, computing system 202 includes at least one processing unit 204, at least one communication unit 206, at least one storage device 208, at least one user interface device 210, at least one communication channel 218, at least one sensor 216, and at least one ECU 220. FIG. 2 illustrates only one particular example of computing system 202, and many other examples of computing system 202 may be used in other instances and may include a subset of the components included in example computing system 202 or may include additional components not shown in FIG. 2.

Communication channels 218 may interconnect each of components 204, 206, 208, 210, 216, and/or 220 for inter-component communications (physically, communicatively, and/or operatively). In some examples, communication channels 218 may include a system bus, a network connection, one or more inter-process communication data structures, or any other components for communicating data.

User interface devices (UID) 210 may enable a user (e.g., an occupant of vehicle 101 of FIG. 1, such as the driver) to interact with computing system 202. UIDs 210 may include one or more input devices 212 and/or more output devices 214. Examples of input devices 212 include display devices (e.g., touchscreens), touchpads, microphones, physical buttons or knobs, among others. Examples of output devices 214 include display devices and speakers, among others. Example display devices include liquid crystal displays (LCD), light emitting diode (LED) displays, organic light-emitting diode (OLED) displays, e-ink, or other device configured to display information to a user.

Communication units 206 may communicate with one or more other computing devices by transmitting and/or receiving data. Communications units 206 may include wired and/or wireless communication units. Examples of wired communication units 206 include Universal Serial Bus (USB) transceivers. Examples of wireless communication units 206 include GPS radios, cellular (e.g., LTE) radios, Bluetooth™ radios, WiFi™ radios, or any other wireless radios.

Examples of sensors 216 include mirror position sensors, seat position sensors, image sensors, among others. In some examples, a mirror position sensor generates mirror position data indicating a position of a respective mirror in one or more dimensions, such as an amount of tilt and/or pan of the respective mirror. A seat position sensor generates seat position data indicating a position of a driver's seat in one or more dimensions, such as a vertical position of the seat, a horizontal position of the driver's seat, and/or an amount of tilt of the driver's seat. An image sensor may generate image data, for example, indicative of an interior of the vehicle. Sensors 216 may output the sensor data generated by the respective sensors, for example, to processing units 204 and/or ECUs 220.

ECUs 220 may represent one or more electronic control units configured to control electronics and various subsystems of vehicle 101, such as mirrors 140, one or more seats, windows, or other components of vehicle 101. ECUs 220 may each be implemented as an embedded system, which may include a microcontroller or other type of processor, memory, inputs, and outputs as noted above. ECUs 220 may interface with one or more of sensors 216, for example by receiving data from sensors 216, to control or support various electronics and/or subsystems of vehicles 101. ECUs 220 may communicate with various components of computing system 202, such as sensors 216 and/or processing units 204 via one or more communication protocols, such as a controller area network (CAN) communication protocol, a FlexRay communication protocol, or any other communication protocol.

Processing units 204 may be implemented as fixed-function processing circuits, programmable processing circuits, or a combination thereof. Fixed-function circuits refer to circuits that provide particular functionality and are pre-set on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

In some examples, storage device 208 may be a temporary memory, meaning that a primary purpose of storage device 208 is not long-term storage. Storage device 208 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device 208 may include one or more non-transitory computer-readable storage devices. Storage device 208 may be configured to store larger amounts of information than typically stored by volatile memory. Storage device 208 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage device 208 may store program instructions and/or information (e.g., data) that, when executed, cause processing unit 204 (and/or ECUs 220) to perform the techniques of this disclosure. For example, storage device 208 may include data or information associated with mirror adjustment module 230.

In accordance with techniques of this disclosure, mirror adjustment module 230 dynamically adjusts the orientation of each mirror 140 of FIG. 1 to maintain a field of view of mirrors 140. Mirror adjustment module 230 may maintain a field of view of mirrors 140 based on the current position of the driver of vehicle 101 and mirror calibration data 232. Mirror calibration data 232 may include data indicating one or more reference driver positions and a reference orientation for each mirror of mirrors 140 for each reference driver position.

Mirror adjustment module 230 may perform a calibration operation to determine a reference orientation of each of mirrors 140 for one or more reference driver positions. In some examples, mirror adjustment module 230 performs the calibration operation in response to receiving a user input (e.g., during a setup procedure performed the first time the driver utilizes vehicle 101). Each reference driver position may be defined by the position of the driver's head and/or by the position of the driver's seat. In some examples, mirror adjustment module 230 may determine each reference driver position based on data from one or more sensors 216. For example, mirror adjustment module 230 may receive image data from one or more image sensors of sensors 215 and determine the position of the driver (e.g., the position of the driver's head) based on the image data. In another example, mirror adjustment module 230 may receive sensor data from one or more seat position sensors of sensors 216 indicating a vertical position of the driver's seat, a horizontal position of the driver's seat, and/or a tilt (also referred to as an inclination) of the driver's seat.

In some examples, the driver of vehicle 101 manually adjusts the seat to the first reference driver position. In another example, mirror adjustment module 230 outputs a command causing the driver's seat to move to the reference driver positions. For example, mirror adjustment module 230 may output a command to a seat motor or actuator causing the driver's seat to move to a first limit position. The limit position may be a position at which the driver's seat is located at a limit of the movement of the driver's seat, such as a limit of the seat's horizontal movement, vertical movement, and/or tilt (e.g., recline). In one instance, the driver of vehicle 101 is located at a first reference driver position when the driver's seat is at a first horizontal limit (e.g., as far forward as possible) and a first vertical limit (e.g., as high as possible). In another instance, the driver of vehicle 101 is located at a second reference driver position when the driver's seat is at a second horizontal limit (e.g., as far back as possible) and a second vertical limit (e.g., as low as possible). In some instances, the driver's seat may be positioned at a tilt limit (as upright as possible or as reclined as possible) when the driver's seat is at a limit of the seat's movement.

The driver of vehicle 101 may orient each of mirrors 140 to provide a first preferred field of view 142 when the driver is positioned at the first reference driver position. Mirror adjustment module 230 determines a first reference orientation of mirrors 140 when the driver is located at the first reference driver position. For example, mirror adjustment module 230 may receive position data from each of the position sensors of mirrors 140 indicating the vertical and/or horizontal position of each mirror 140 when the driver is located in the first reference driver position. In one example, the position data indicates the amount of tilt and/or pan of each mirror 140.

Mirror adjustment module 230 may determine a second reference orientation for mirrors 140 during the calibration operation. In one example, mirror adjustment module 230 determines the second orientation of mirrors 140 when the driver is located at a second reference driver position. In some instances, mirror adjustment module 230 outputs a command to adjust the position of the driver's seat to locate the driver's seat at a second reference position. In another instance, the driver of vehicle 101 adjusts the position of his or her seat to locate the driver's seat at a second reference position.

In some examples, the driver of vehicle 101 adjusts mirrors 140 to provide a second preferred field of view. The second preferred field of view may include at least a threshold portion of the first field of view. In other words, the driver may re-orient mirrors 140 such that mirrors 140 each provide a respective second field of view that is substantially similar to (e.g., that includes at least a threshold portion) a first field of view that is provided by mirrors 140.

Responsive to performing the calibration operation, mirror adjustment module 230 may store mirror calibration data 232 indicating the reference orientation of each mirror for each reference driver position. Mirror calibration data 232 includes data indicating the first reference driver position (e.g., the position of the driver's head and/or the seat position) and first reference orientation of each mirror 140 associated with the first reference driver position. Mirror calibration data 232 may include data indicating the second reference driver position and the reference orientation of each mirror 140 associated with the second reference driver position. In some examples, mirror calibration data 232 includes data identifying the driver and the reference orientations and reference driver positions for each driver. In this way, mirror adjustment module 230 may store data customized data for each driver and may dynamically adjust the orientation of mirrors 140 to provide a field of view preferred by each respective driver of vehicle 101 when the driver position changes.

After performing the calibration process for a driver of vehicle 101, a driver (e.g., a different driver or the same driver) may adjust a position of the driver's seat, a position of the mirrors, or a combination thereof. For example, mirror adjustment module 230 may perform the calibration process when a driver acquires vehicle 101 or drives vehicle 101 the first time. Afterwards (e.g., days, weeks, or even months later), a driver may adjust the seat and/or mirrors at a current time. In some examples, mirror adjustment module 230 identifies the driver of vehicle 101 at the current time. The driver of vehicle 101 at the current time is also referred to as the current driver.

Mirror adjustment module 230 may automatically identify the current driver. In one example, mirror adjustment module 230 receives image data from sensors 216 (e.g., an image sensor) and identifies the driver by performing image recognition on the image data. In some instances, mirror adjustment module 230 identifies the driver based on user input received from one or more input devices 212. For instance, mirror adjustment module 230 may receive audio data from input device 212 (e.g., a microphone) and may perform voice recognition on the audio data to identify the driver. In another instance, input devices 212 includes one or more physical buttons that are each associated with a respective driver such that mirror adjustment module 230 may identify the driver in response to receiving a user input selecting a particular button associated with the current driver. In yet another instance, input devices 212 include a touchscreen and mirror adjustment module 230 identifies the driver in response to receiving user data indicating the driver selected a graphical button or icon associated with that particular driver.

Responsive to identifying the current driver, mirror adjustment module 230 may automatically re-orient mirrors 140 to provide the preferred field of view for the driver or a field of view that is substantially similar to the preferred field of view for the current driver. In other words, mirror adjustment module 230 automatically adjusts the mirrors based on the mirror calibration data for the current driver and the current driver position.

In some examples, mirror adjustment module 230 determines the current driver position based on sensor data generated by one or more sensors. For example, mirror adjustment module 230 may receive image data that includes one or more images of the interior of the vehicle, detect the driver's head in one or more of the images, and determine the current driver position in response to detecting the driver's head. In another example, mirror adjustment module 230 determines the current driver position based on seat position data generated by one or more seat position sensors.

Mirror adjustment module 230 may determine whether the current orientation of mirrors 140 is a preferred orientation for the current driver position. Mirror adjustment module 230 may determine the current orientation of mirrors 140 based on position data from mirror position sensors. In some examples, the preferred orientation for each driver position provides a substantially similar field of view as the preferred field of view. In some examples, the preferred orientation of mirrors 140 may cause mirrors 140 to provide a field of view that includes at least a threshold portion (e.g., 75%, 85%, 90%) of the field of view that provided by mirrors 140 when mirrors 140 are oriented according to the first reference orientation and the driver is positioned at the first reference driver position, and/or that includes at least a threshold portion of the field of view provided by mirrors 140 when mirrors 140 are oriented according to the second reference orientation and the driver is positioned at the second reference driver position.

Mirror adjustment module 230 may determine the preferred orientation by querying the mirror calibration data 232. In some instances, mirror calibration data 232 includes data indicating a reference orientation for one or more reference driver positions for one or more drivers of vehicle 101. For instance, for each driver, mirror calibration data 232 may include a first reference mirror orientation for a first reference driver position and a second reference mirror orientation for a second driver position for each driver. In other words, mirror adjustment module 230 may query mirror calibration data 232 to determine the first reference driver position, the second reference driver position, the first reference orientation, and the second reference orientation based on the identity of the current driver. In such instances, mirror adjustment module 230 may determine the preferred orientation by interpolating between the first and second mirror orientations, the first and second reference driver positions, and the current driver position. That is, mirror adjustment module 230 may determine a difference between the first reference driver position and the second reference driver position and a difference between the first reference orientation and the second reference orientation, and determine the preferred orientation based on a combination of the current driver position, the difference in reference driver positions, and the difference in reference orientations. Thus, in some examples, mirror adjustment module 230 determines a preferred mirror orientation that causes mirrors 140 to provide a field of view that is substantially similar to the driver's preferred field of view.

Responsive to determining the preferred orientation of mirrors 140, mirror adjustment module 230 may automatically set each of mirrors 140 to the respective preferred orientations. For example, mirror adjustment module 230 may output a command to control a motor or actuator that adjusts the orientation (e.g., tilt and/or pan) of each mirror 140. In this way, mirror adjustment module 230 may dynamically adjust the orientation of the mirrors to provide substantially the same field of view as the driver position changes (e.g., if the driver re-positions his or her seat). Automatically adjusting the orientation of the mirrors may assist the driver in reducing or eliminating blind spots, which may reduce the risk of collisions and potentially increasing safety of the occupants of vehicle 101 and people in proximity to vehicle 101. In some examples, adjusting the orientation of mirrors 140 by interpolating between two or more reference orientations based on two or more reference driver positions and the current driver position may more enable mirrors 140 to provide a field of view that more closely matches the driver's preferred field of view, which may enable the driver to be more aware of his or her surroundings and thus improve the safety of people within the vehicle and people nearby.

In some examples, mirror adjustment module 230 automatically adjusts the field of view provided by one or more of mirrors 140 based on a speed of vehicle 101. For example, mirror adjustment module 230 may receive data indicating a speed of vehicle 101 (e.g., from an ECU 220 coupled to a wheel speed sensor of sensors 216). In such examples, mirror adjustment module 230 may determine an updated field of view based on the speed of vehicle 101. For example, mirror adjustment module 230 may shift the field of view outward from vehicle 101 and/or upward, which may enable the driver of vehicle 101 to see more of the roadway and surroundings as the speed of vehicle 101 increases. Mirror adjustment module 230 may output a command to a motor or actuator of a mirror 140 to adjust the orientation of the mirror 140 and thus provide an update field of view 142.

Mirror adjustment module 230 may automatically adjust the field of view provided by a mirror 140 in response to detecting an object in proximity to vehicle 101. For example, an image sensor of sensors 216 may provide image data indicative of a person in proximity to vehicle 101. Mirror adjustment module 230 may perform object recognition on the image data and determine the person is in proximity to vehicle 101 (e.g., within a threshold distance of vehicle 101). Mirror adjustment module 230 may determine an updated field of view that includes the object for one or more mirrors 140. In one example, mirror adjustment module 230 adjusts the orientation of one or more mirrors 140 based on the updated field of view such that mirror 140 provides the updated field of view that includes the object. For example, if mirror adjustment module 230 detects a person passing behind vehicle 101, mirror adjustment module 230 may automatically output a command to re-orient mirrors 140 such that the person is visible in the field of view provided by at least one mirror 140 as a person passes behind vehicle 101.

Figure 3:
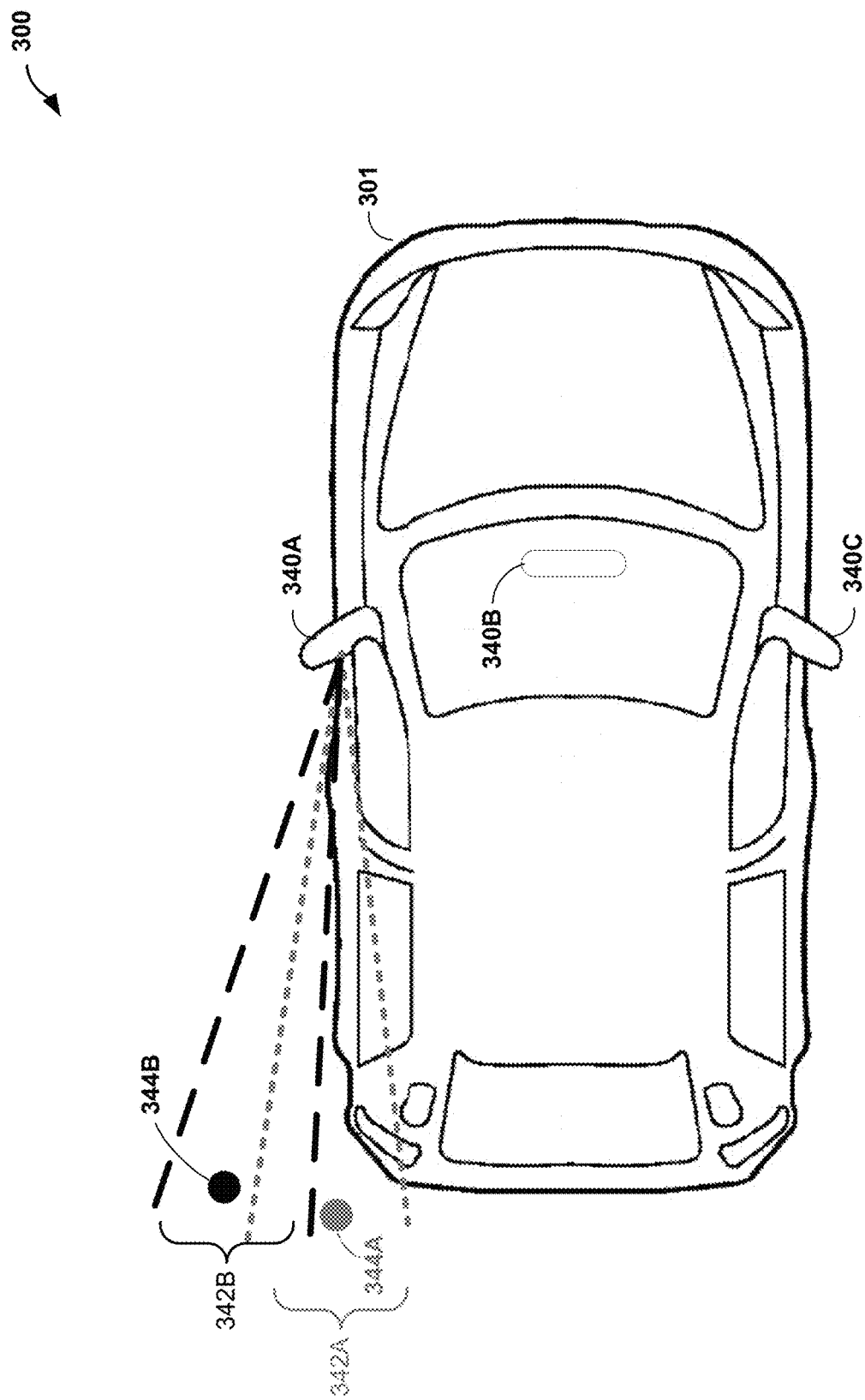
FIG. 3 is a conceptual diagram illustrating a graphical user interface enabling a driver to adjust the orientation of a mirror, in accordance with one or more aspects of the present disclosure.

FIG. 3 is a conceptual diagram illustrating a graphical user interface enabling a driver to adjust the orientation of a mirror, in accordance with one or more aspects of the present disclosure. FIG. 3 is described in the context of computing system 202 of FIG. 2.

In some scenarios, mirror adjustment module 230 outputs a graphical user interface 300 (GUI) for display via output devices 214. In the example of FIG. 3, GUI 300 illustrates a 360-degree view of vehicle 301, a field of view 342A for mirror 340A, and a center 344A of field of view 342A. Additionally or alternatively, in some examples, GUI 300 illustrates a field of view and a center of the respective field of view for mirrors 340B and/or 340C.

Mirror adjustment module 230 may receive user input data from input devices 212 indicative of a user input selecting a new field of view 342B for mirror 340A. For example, input device 212 may include a touchscreen that detects a gesture (e.g., a tap, pinch, drag, etc.) indicating a command to update the field of view provided by mirror 340A to field of view 342B. In the example of FIG. 3, the original field of view 342A includes a portion of vehicle 301 and the updated field of view 342B may reduce the driver's blindspots by including more of the area adjacent to vehicle 301 relative to field of view 342A. Mirror adjustment module 230 may update GUI 300 to illustrate updated field of view 342B.

In some examples, mirror adjustment module 230 may output a command to adjust the orientation of mirror 340A in response to determining the updated orientation of mirror 340A. For example, mirror adjustment module 230 may output a command to an ECU 220 controlling an actuator or motor coupled to mirror 340A to adjust the orientation of mirror 340A. In this way, mirror adjustment module 230 may provide a graphical indication of the field of view provided by mirrors 340 and may enable a driver of vehicle 301 to more easily adjust mirrors 340 to provide his or her preferred field of view.

Providing a 360-degree view of vehicle 301 and the fields of view 342 of mirrors 340 may enable the driver to easily ascertain his or her entire field of view on the display device. Enabling the driver to adjust the fields of view 342 via the display device and displaying the updated fields of view 342 on a single screen (e.g., rather than manually checking the fields of view in each of mirrors 340) may enable the driver to more visualize the cumulative field of view across all of mirrors 340 and adjust the individual fields of view, which may assist the driver in reducing or eliminating blind spots. In this way, mirror adjustment module 230 may increase the safety of the occupants of vehicle 301 and other people nearby, while potentially reducing the risk of damage to vehicle 301 or nearby objects.

Figure 4A:
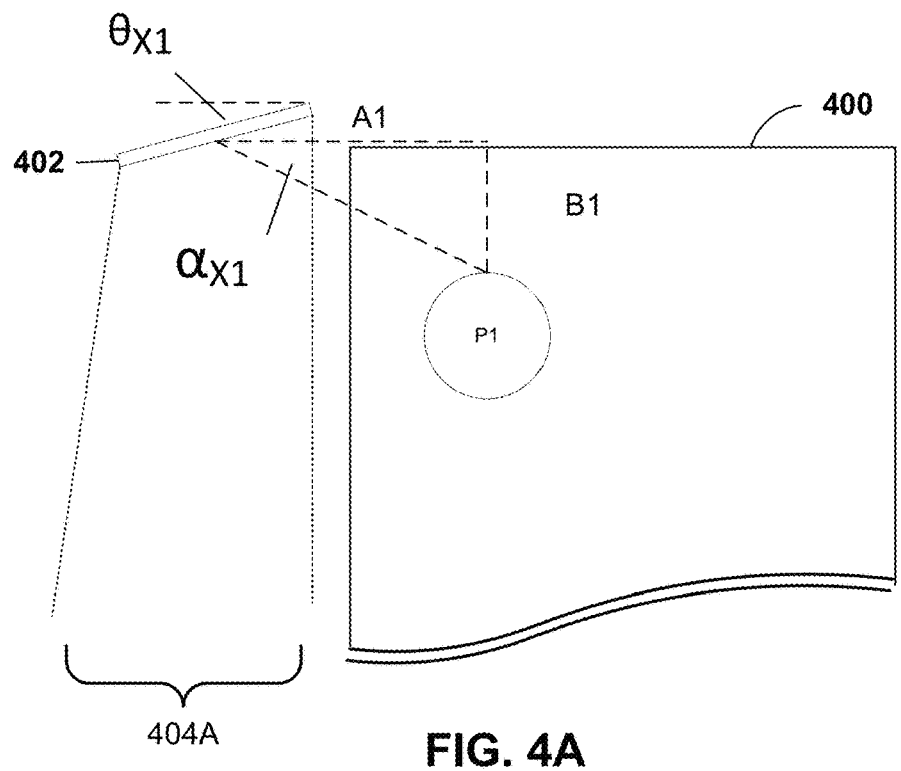
FIGS. 4A-4C are conceptual diagram illustrating a vehicle mirror calibration process, in accordance with one or more aspects of the present disclosure.
Figure 4B:
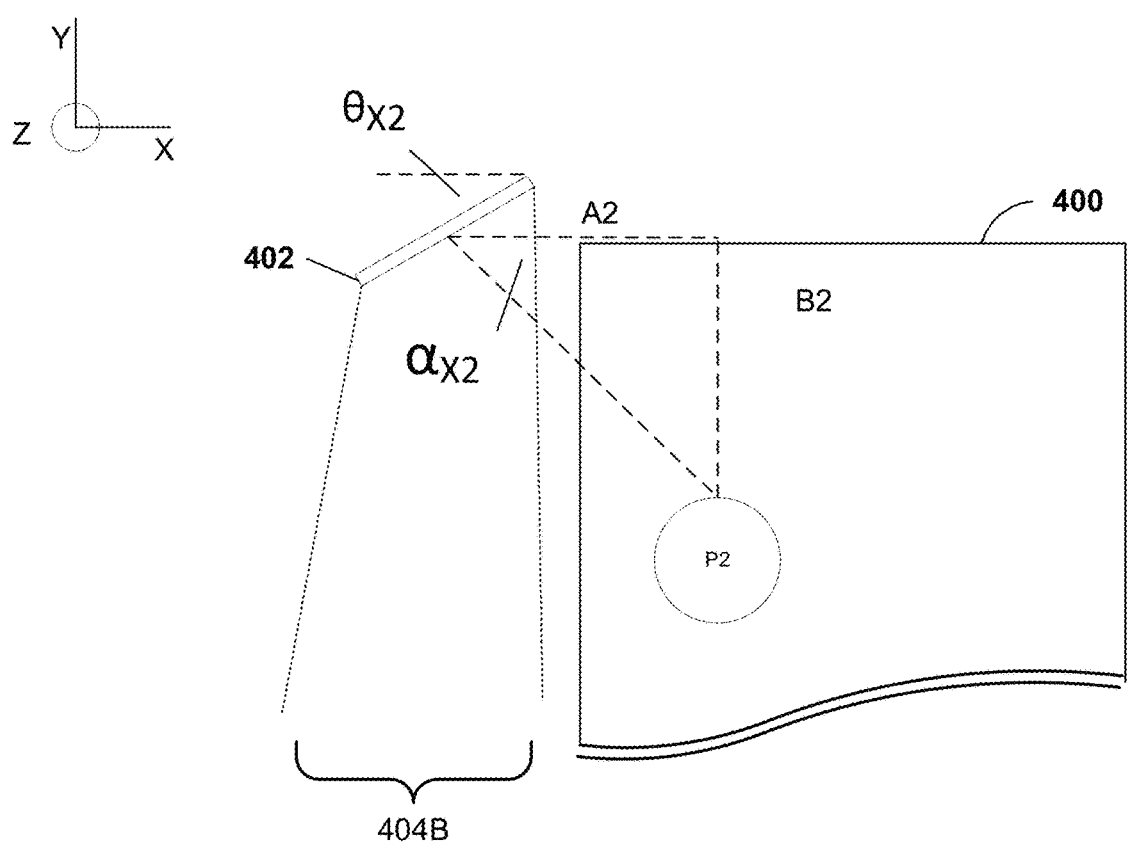
Figure 4C:
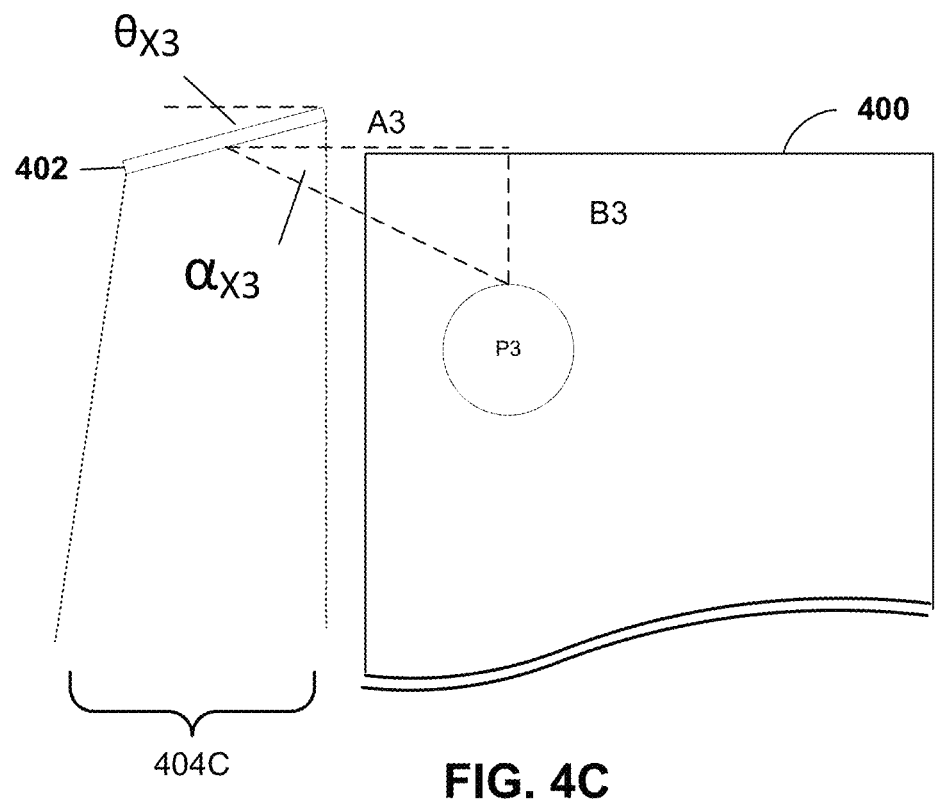
Figure 4C:
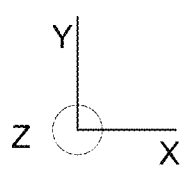

FIGS. 4A-4C are conceptual diagram illustrating a vehicle mirror calibration process, in accordance with one or more aspects of the present disclosure. FIGS. 4A-4C are described in the computing system 202 of FIG. 2. Vehicle 400 may be an example of vehicle 101 of FIG. 1. Computing system 202 may perform a calibration operation by determining one or more reference driver positions and one or more reference orientations for mirrors 402 of vehicle 400 associated with the respective reference driver positions.

Mirror adjustment module 230 of computing system 202 performs a first calibration operation by determining a first reference driver position and a first reference orientation of mirror 402. In the example of FIG. 4A, mirror 402 provides a first field of view 404A when the driver is located at a first reference driver position P1 and mirror 402 is oriented with a first reference orientation $\theta_1$. Mirror adjustment module 230 determines the location of the first reference driver position P1 based on sensor data generated by sensors 216. For example, mirror adjustment module 230 may determine a position of the driver's head and/or a position of the driver's seat as the first reference driver position P1. In one instance, mirror adjustment module 230 determines coordinates of the first reference driver position (e.g., cartesian coordinates or spherical coordinates). For instance, mirror adjustment module 230 may determine x, y, and z coordinates of the first reference driver position. The driver position in the x, y, and z dimensions are also referred to as DriverPosX$_N$, DriverPosY$_N$, and DriverPosZ$_N$, respectively, where N represents some time (N=1, 2, etc.).

In some examples, mirror adjustment module 230 determines a position of mirror 402 when the driver is located at the first reference driver position P1. In one example, mirror 402 is fixedly attached to vehicle 400. In such examples, mirror adjustment module 230 may determine the position of mirror 402 by querying mirror calibration data 232. In some instances, mirror 402 is adjustably attached to vehicle 400. For instance, mirror 402 may be extendable in the x-direction (e.g., perpendicular to a side of vehicle 400). In such instances, mirror adjustment module 230 may determine a position of mirror 402 based on one or more sensors (e.g., a mirror position sensor and/or image sensor). The position of mirror 402 in the x, y, and z dimensions are also referred to as MirrorPosX$_N$, MirrorPosY$_N$, and MirrorPosZ$_N$, respectively.

Mirror adjustment module 230 determines the reference orientation ON of mirror 402 when the driver is located at a reference driver position. The orientation of mirror 402 in the x and z directions are referred to as $\theta X_N$ and $\theta Z_N$, respectively. Mirror adjustment module 230 may determine the first reference orientation $\theta_1$ of mirror 402 based on sensor data generated by mirror position sensors.

In the example of FIG. 4B, mirror 402 provides a second field of view 404B when the driver is located at a second reference driver position P2 and mirror 402 is oriented with a second reference orientation. In some examples, mirror adjustment module 230 performs a second calibration operation by determining a second reference driver position (P2), a position of mirror 402 when the driver is located at the second reference driver position P2, and a second reference orientation of mirror 402 when the driver is located at the second reference driver position P2. In one example, a driver of vehicle 400 adjusts the position of the driver's seat during the calibration operation such that the driver is located at a second reference position. In another example, mirror adjustment module 230 outputs a command to a motor or actuator coupled to the driver's seat to locate the driver's seat at the second reference driver position.

Responsive to determining the reference driver positions, the reference orientation of mirror 402, and the mirror positions, mirror adjustment module 230 determines a distance between each reference driver position and mirror 402 in each of the x, y, and z dimensions. In one example, mirror adjustment module 230 determines a distance $A_N$ between a reference driver position and a position of mirror 402 in the X-dimension according to Equation 1, a distance $B_N$ in the Y-dimension according to Equation 2, and a distance $C_N$ (not shown in the FIGS.) in the Z-dimension according to Equation 3.

$$A_N = \text{abs}(\text{DriverPosX}_N - \text{MirrorPosX}_N) \quad \text{Equation 1:}$$

$$B_N = \text{abs}(\text{DriverPosY}_N - \text{MirrorPosY}_N) \quad \text{Equation 2:}$$

$$C_N = \text{abs}(\text{DriverPosZ}_N - \text{MirrorPosZ}_N) \quad \text{Equation 3:}$$

Mirror adjustment module 230 may determine the angle $\alpha_N$ in the x and z dimensions based on based on Equations 4 and 5, respectively.

$$\alpha_{XN} = \frac{\arctan\left(\frac{A_N}{B_N}\right)}{k} \quad \text{Equation 4}$$

$$\alpha_{ZN} = \frac{\arctan\left(\frac{C_N}{B_N}\right)}{k} \quad \text{Equation 5}$$

In some examples, k is a constant (e.g., k=2).

In some examples, mirror adjustment module 230 determines an preferred orientation (e.g., $\theta_{X3}$ and $\theta_{Z3}$) of mirror 402 based the current driver position P3 and calibration data for a single calibration operation (e.g. the first calibration operation). In one example, the calibration data for the first calibration operation includes the first reference orientation $\theta_1$ (e.g., $\theta_{X1}$ and $\theta_{Z1}$) and the coordinates of the first reference driver position P1. For example, mirror adjustment module 230 determines angle $\alpha_{X3}$ and $\alpha_{Z3}$ by inputting the coordinates of the current driver position P3 and coordinates of the mirror into equations 1-3 to determine the distance (e.g., $A_3$, $B_3$, and $C_3$) between the current driver position and the current position of mirror 402. Mirror adjustment module 230 may input the distances ($A_3$, $B_3$, and $C_3$) into equations 4-5. In one example, mirror adjustment module 230 determines an angular distance $\Delta\alpha_X$ between angle $\alpha_{X3}$ and angles $\alpha_{X1}$ according to Equation 6.

$$\Delta\alpha_X = \alpha X_1 - \alpha_{X3} \quad \text{Equation 6:}$$

Similarly, mirror adjustment module 230 may determines an angular distance $\Delta\alpha_Z$ between angle $\alpha_{Z3}$ and angles $\alpha_{Z1}$ according to Equation 7.

$$\Delta\alpha_Z = \alpha_{Z1} - \alpha_{Z3} \quad \text{Equation 7:}$$

In some examples, mirror adjustment module 230 determines the preferred mirror orientation $\theta_3$ (e.g., $\theta_{X3}$ and $\theta_{Z3}$) associated with the current driver position based on equations 8 and 9.

$$\theta_{X3}=\theta_{X1}+\Delta\alpha_X \quad \text{Equation 8:}$$

$$\theta_{Z3}=\theta_{Z1}+\Delta\alpha_Z \quad \text{Equation 9:}$$

In one example, mirror adjustment module 230 determine a preferred orientation $\theta_3$ (e.g., $\theta_{X3}$ and $\theta_{Z3}$) of mirror 402 based on the current driver position P3, the calibration data for the first calibration operation, and the calibration data for the second calibration operation. The calibration data for the second calibration operation may include the second reference orientation $\theta_2$ (e.g., $\theta_{X2}$ and $\theta_{Z2}$) and the coordinates of the second reference driver position.

Mirror adjustment module 230 may determine a mirror adjustment factor (e.g., a constant) based on the first reference orientation (e.g., $\theta X_1$, $\theta Z_1$), the second reference orientation (e.g., $\theta X_2$, $\theta Z_2$), the first reference driver position, and the second reference driver position. For example, mirror adjustment module 230 may calculate a difference in driver position between the first reference driver position and the second reference driver position in each dimension, as illustrated by equations 10-12.

$$\Delta X=\text{abs}(\text{DriverPosX}_1-\text{DriverPosX}_2) \quad \text{Equation 10:}$$

$$\Delta Y=\text{abs}(\text{DriverPosY}_1-\text{DriverPosY}_2) \quad \text{Equation 11:}$$

$$\Delta Z=\text{abs}(\text{DriverPosZ}_1-\text{DriverPosZ}_2) \quad \text{Equation 12:}$$

Similarly, mirror adjustment module 230 may calculate a difference in mirror orientations $\Delta\theta$ between the first reference orientation and the second reference orientation in each dimension, as shown by equations 13-14.

$$\Delta\theta_X=\Delta\theta_{X_1}-\Delta\theta_{X_2} \quad \text{Equation 13:}$$

$$\Delta\theta_Z=\Delta\theta_{Z_1}-\Delta\theta_{Z_2} \quad \text{Equation 14:}$$

In some instances, mirror adjustment module 230 determines a mirror adjustment factor "MirrorAdjustFactor" in the x and z dimensions based on the difference in reference driver positions and the difference in mirror orientations, as shown by Equations 15-16. In other words, the mirror adjustment factor indicates how much the orientation of mirror 402 changes for a given amount of movement in the driver position.

$$MirrorAdjFactor_X = \frac{\Delta\theta_X}{\Delta X} \quad \text{Equation 15}$$

$$MirrorAdjFactor_Z = \frac{\Delta\theta_Z}{\Delta Z} \quad \text{Equation 16}$$

As illustrated in FIG. 4C, mirror adjustment module 230 determines a current driver position P3 of the driver of vehicle 400. The current driver position P3 may be defined by x, y, and z coordinates $\text{DriverPosX}_3$, $\text{DriverPosY}_3$, and $\text{DriverPosZ}_3$, respectively. Mirror adjustment module 230 may determine a distance "DistanceToRefPos" between the current driver position P3 and one of the first or second reference driver position, as shown in Equations 17-18. While Equations 17 and 18 calculate the distance DistanceToRefPos utilizing the coordinates for the current driver position P3 and the first reference driver position P1, it should be understood that the distance DistanceToRefPos may also be calculated utilizing the coordinates for the current driver position P3 and the second reference driver position P2.

$$\text{DistanceToRefPos}_X=\text{abs}(\text{PosDriverPosX}_1-\text{DriverPosX}_3) \quad \text{Equation 17:}$$

$$\text{DistanceToRefPos}_Z=\text{abs}(\text{PosDriverPos}_{Z_1}-\text{DriverPos}_{Z_3}) \quad \text{Equation 18:}$$

Mirror adjustment module 230 determines the preferred orientation $\theta_3$ for mirror 402 corresponding to the current driver position P3. In one example, mirror adjustment module 230 determines the preferred orientation $\theta_3$ (e.g., $\theta_{X3}$ and $\theta_{Z3}$) as shown in Equations 19 and 20. While Equations 19 and 20 calculate the preferred orientation $\theta_3$ utilizing the first reference orientation $\theta_1$, it should be understood that the updated orientation $\theta_3$ may also be calculated utilizing the second reference orientation $\theta_2$.

$$\theta_{X3} = \theta_{X1} + \frac{DistanceToRefPos_X}{MirrorAdjFactor_X} \quad \text{Equation 19}$$

$$\theta_{Z3} = \theta_{Z1} + \frac{DistanceToRefPos_Z}{MirrorAdjFactor_Z} \quad \text{Equation 20}$$

In this way, mirror adjustment module 230 may interpolate between the first reference orientation and the second reference orientation to determine the preferred orientation of the mirror. In other words, mirror adjustment module 230 utilizes the first reference orientation, second reference orientation, first reference driver position, and second reference driver position to determine an preferred orientation of the mirror that provides a field of view substantially similar to the driver's preferred field of view given the current driver position.

Responsive to determining the preferred orientation $\theta_3$ for mirror 402, mirror adjustment module 230 may output a command to one or more motors or actuators coupled to mirror 402 to orient mirror 402 according to the preferred orientation $\theta_3$. In this way, mirror 402 may provide field of view 404C, which may include at least a threshold portion of the preferred field of view 402A and/or a threshold portion of the preferred field of view 402B. While mirror 402 is illustrated as a driver's side mirror, mirror adjustment module 230 may determine an preferred orientation for a center rear-view mirror and/or a passenger's side mirror (e.g., mirrors 140B and 140C of FIG. 1, respectively).

Figure 5:
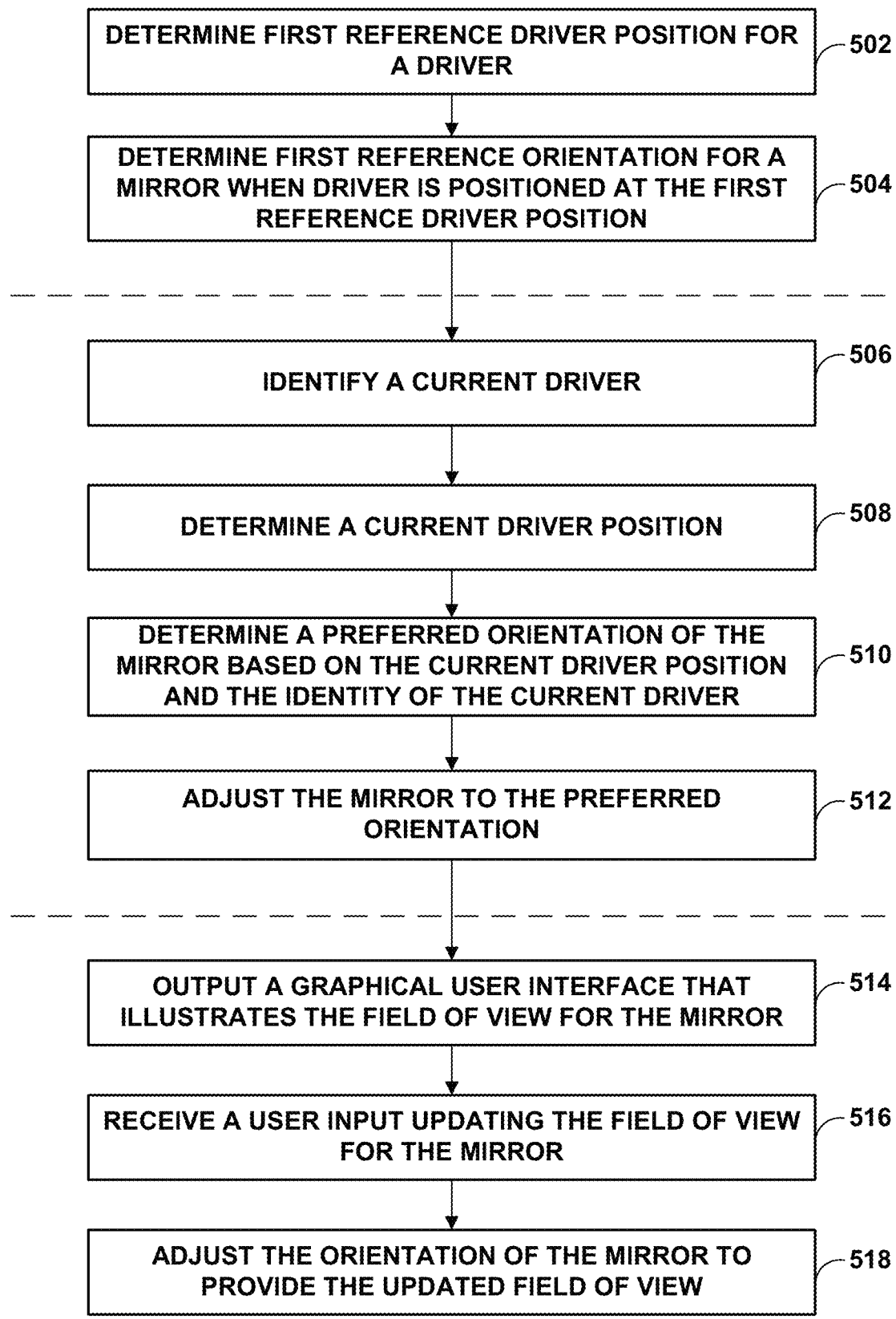
FIG. 5 is a flowchart illustrating example operations of an example computing system that dynamically adjusts the mirrors of a vehicle, in accordance with one or more aspects of the present disclosure.

FIG. 5 is a flowchart illustrating example operations of an example computing system that dynamically adjusts the mirrors of a vehicle, in accordance with one or more aspects of the present disclosure. FIG. 5 is described with reference to vehicle 101 of FIG. 1 and computing system 202 of FIG. 2.

Mirror adjustment module 230 may perform a calibration operation to determine an orientation of mirrors 140 for one or more reference driver positions. In some examples, mirror adjustment module 230 determines a first reference driver position during the calibration operation (502). For example, mirror adjustment module 230 may determine the first reference driver position based on sensor data from one or more sensors 216, such as an image sensor, one or more seat position sensors, or a combination thereof.

During the calibration operation, in some examples, mirror adjustment module 230 determines a first reference orientation for each of mirrors 140 when the driver is located at the first reference driver position (504). For example, a driver of vehicle 101 may orient mirrors 140 to provide a first preferred field of view. Mirror adjustment module 230 may determine the first reference mirror orientation for each mirror based on sensor data from one or more sensors 216, such as mirror positions sensors. Responsive to determining the first reference orientation and the first reference driver position, mirror adjustment module 230 may store data indicative of the first reference orientation and the first reference driver position to mirror calibration data 232. In some examples, mirror calibration data 232 includes data indicating the identity of the driver and associates the data indicating the identity of the driver with the first reference orientation and the first reference driver position.

In one example, a driver of vehicle 101 may adjust a position of the driver's seat as part of the calibration operation. In other example, mirror adjustment module 230 may output a command to adjust the position of the driver's seat during the calibration operation. When the driver is located at the second driver reference position, the driver may re-orient mirrors 140 to provide a second preferred field of view. In some instances, the first preferred field of view includes at least a threshold portion of the first preferred field of view. For instance, the driver may orient mirrors 140 to maintain the same field of view (or as close as possible to the same field of view) between the first and second reference driver positions. In some examples, mirror adjustment module 230 determines a second reference driver position and a second reference orientation for mirrors 140 during the calibration process in a similar manner as determining the first reference driver position and the first reference orientation for mirrors 140. Mirror adjustment module 230 may store data associating the identity of the driver, the second reference orientation, and the second reference driver position to mirror calibration data 232.

At a current time (e.g., a time that occurs after performing the calibration operation), a current driver may enter the driver's seat of vehicle 101. In some examples, mirror adjustment module 230 identifies the current driver (506). Mirror adjustment module 230 may identify the current driver by performing facial recognition of image data generated by an image sensor or by performing voice recognition of audio data generated by an audio input device. In another example, mirror adjustment module 230 may identify the current driver in response to the current driver selecting a physical or graphical button associated with the current driver.

Mirror adjustment module 230 determines a current driver position of the current driver (508). For example, mirror adjustment module 230 may determine the current driver position based on image data generated by one or more image sensors and/or seat position data generated by one or more seat position sensors, as described above.

Responsive to determining the current driver position, mirror adjustment module 230 determines a preferred orientation for one or more mirrors 140 (510). For example, mirror adjustment module 230 may determine preferred orientation based on the identity of the current driver and mirror calibration data 232 associated with the current driver. In some examples, mirror calibration data 232 includes data indicating a single reference driver position for the current driver and a single reference orientation for each of mirrors 140 for the current driver. In another example, mirror calibration data 232 includes data indicative of a plurality of reference driver positions for the current driver and a reference orientation for each of mirrors 140 for each of the plurality of reference positions for the current driver.

Mirror adjustment module 230 may determine the preferred orientation as described with reference to FIGS. 4A-4C. For example, mirror adjustment module 230 may determine the preferred orientation for the current driver based on a current driver position, a difference between first and second reference driver position, and a difference between a first and second mirror orientations.

Mirror adjustment module 230 adjusts the orientation of one or more mirrors 140 in response to determining the current orientation of mirrors 140 is not the preferred orientation for each respective mirror 140 (512). For example, mirror adjustment module 230 may output a command to causes one or more motors or actuators coupled to a respective mirror to adjust the respective mirror 140 to the respective preferred orientation.

In some examples, mirror adjustment module outputs a graphical user interface for display via one or more output device 214 (e.g., a touchscreen) (514). In one example, the graphical user interface illustrates the field of view 142 for one or more mirrors 140 of vehicle 101. The graphical user interface may indicate the center location 144 of each field of view 142.

Mirror adjustment module 230 may receive user input data indicative of a command to change the field of view 142 of a particular mirror 140 (e.g., mirror 140A) (516). For example, the driver of vehicle 101 may perform a gesture (e.g., a tap, swipe, drag, etc.) and mirror adjustment module 230 may receive data indicative of the gesture from the touchscreen. Mirror adjustment module 230 may determine the gesture indicates a command to update the field of view 142A of mirror 140A. In one example, mirror adjustment module 230 updates the graphical user interface to illustrate the updated field of view 142A.

Responsive to receiving the user input indicating the command to change the field of view 142A of mirror 140A, mirror adjustment module 230 may adjust the orientation of mirror 140A based on the updated field of view 142A (518). For instance, mirror adjustment module 230 may determine the updated orientation of mirror 140A that provides the updated field of view based on the mirror calibration data 232 for the current driver and the current position of the current driver. In one instance, mirror adjustment module 230 outputs a command to re-orient mirror 140A that causes an actuator or motor to adjust the orientation of mirror 140A to provide the updated field of view 142A.

The following numbered examples may illustrate one or more aspects of the disclosure:

Example 1. A method comprising: determining a current orientation of a mirror of the vehicle; determine a preferred orientation of the mirror based on a current driver position of a driver of a vehicle, a difference between a first reference driver position for the driver and a second reference driver position for the driver, and a difference between a first reference orientation of the mirror when the driver is positioned at the first reference driver position and a second reference orientation when the driver is positioned at the second reference driver position; and outputting a command to adjust the orientation of the mirror in response to determining the orientation of the mirror.

Example 2. The method of example 1, wherein a field of view of provided by the mirror when the mirror is positioned according to the preferred orientation includes a least threshold portion of a first field of view that is provided by the mirror when the mirror is oriented according to the first reference orientation and the driver is positioned at the first reference driver position and at least the threshold portion of a second field of view that is provided by the mirror when the mirror is oriented according to the second reference orientation and the driver is positioned at the second reference driver position.

Example 3. The method of example 1, wherein the first reference driver position is defined by a first vertical position limit and a first horizontal position limit, and wherein the second reference driver position is defined by a second vertical position limit opposite the first vertical position limit and a second horizontal position limit opposite the first horizontal position limit.

Example 4. The method of example 1, wherein determining the current position of the driver is based on data from one or more of an image sensor or a seat position sensor.

Example 5. The method of example 1, further comprising: identifying the driver; and determining, based on identity of the driver, the first reference driver position, the second reference driver position, the first reference orientation, and the second reference orientation.

Example 6. The method of example 1, further comprising: outputting, for display by a display device of the vehicle, a graphical user interface indicating a field of view provided by the mirror; and responsive to receiving a user input indicating an updated field of view, adjusting the mirror based on the updated field of view.

Example 7. The method of example 1, wherein the mirror provides a field of view, the method further comprising: determining an updated field of view based on a speed of the vehicle; and adjusting the mirror based on the updated field of view.

Example 8. The method of example 1, wherein the mirror provides a field of view, the method further comprising: responsive to detecting an object behind the vehicle: determining an updated field of view that includes the object; and adjusting the mirror based on the updated field of view.

Example 9. A computing system comprising: at least one processor; a memory comprising instructions that, when executed, cause the at least one processor to: determine a current orientation of a mirror of the vehicle; determine a preferred orientation of the mirror based on a current driver position of a driver of the vehicle, a difference between a first reference driver position for the driver and a second reference driver position for the driver, and a difference between a first reference orientation of the mirror when the driver is positioned at the first reference driver position and a second reference orientation when the driver is positioned at the second reference driver position; and output a command to adjust the orientation of the mirror in response to determining the orientation of the mirror.

Example 10. The computing system of example 9, further comprising means for performing the method of any one of examples 2-8.

Example 11. A computing system comprising means for performing the method of any one of examples 1-8.

Example 12. A computer-readable storage medium comprising instructions that, when executed by at least one processor of a computing system of a vehicle, cause the at least one processor to perform the method of any one of examples 1-8.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system comprising:
   at least one processor; and
   memory comprising instructions that, when executed, cause the at least one processor to:
   determine a current orientation of a mirror of a vehicle;
   determine a preferred orientation of the mirror based on
   1) a current driver position of a driver of the vehicle,
   2) a difference between a first reference driver position for the driver and a second reference driver position for the driver, wherein the first reference driver position is defined by a first vertical position limit of a driver seat and a first horizontal position limit of the driver seat, and wherein the second reference driver position is defined by a second vertical position limit of the driver seat opposite the first vertical position limit and a second horizontal position limit of the driver seat opposite the first horizontal position limit, and
   3) a difference between a first reference orientation of the mirror when the driver is positioned at the first reference driver position and a second reference orientation when the driver is positioned at the second reference driver position; and
   responsive to determining the current orientation is not the preferred orientation, output a command to adjust the mirror to the preferred orientation.

2. The computing system of claim 1, wherein a field of view provided by the mirror when the mirror is positioned according to the preferred orientation includes a least threshold portion of a first field of view that is provided by the mirror when the mirror is oriented according to the first reference orientation and the driver is positioned at the first reference driver position and at least the threshold portion of a second field of view that is provided by the mirror when the mirror is oriented according to the second reference orientation and the driver is positioned at the second reference driver position.

3. The computing system of claim 1, wherein executing the instructions further causes the at least one processor to determine the current position of the driver based on data from one or more of an image sensor or a seat position sensor.

4. The computing system of claim 1, wherein executing the instructions further causes the at least one processor to:
   identify the driver; and
   determine, based on identity of the driver, the first reference driver position, the second reference driver position, the first reference orientation, and the second reference orientation.

5. The computing system of claim 1, wherein execution of the instructions further cause the at least one processor to:
   output, for display by a display device of the vehicle, a graphical user interface indicating a field of view provided by the mirror; and
   responsive to receiving a user input indicating an updated field of view, adjust the mirror based on the updated field of view.

6. The computing system of claim 1, wherein the mirror provides a field of view, and wherein execution of the instructions further cause the at least one processor to:
   determine an updated field of view based on a speed of the vehicle; and
   adjust the mirror based on the updated field of view.

7. The computing system of claim 1, wherein the mirror provides a field of view, and wherein executing the instructions further causes the at least one processor to:
   responsive to detecting an object behind the vehicle:
     determine an updated field of view that includes the object; and
     adjust the mirror based on the updated field of view.

8. A device comprising:
   means for determining a current orientation of a mirror of a vehicle;
   means for determining a preferred orientation of the mirror based on
   1) a current driver position of a driver of the vehicle,
   2) a difference between a first reference driver position for the driver and a second reference driver position for the driver, wherein the first reference driver position is defined by a first vertical position limit of a driver seat and a first horizontal position limit of the driver seat, and wherein the second reference driver position is defined by a second vertical position limit of the driver seat opposite the first vertical position limit and a second horizontal position limit of the driver seat opposite the first horizontal position limit, and
   3) a difference between a first reference orientation of the mirror when the driver is positioned at the first reference driver position and a second reference orientation when the driver is positioned at the second reference driver position; and
   means for outputting a command to adjust the mirror to the preferred orientation in response to determining the current orientation is not the preferred orientation.

9. A method comprising:
   determining a current orientation of a mirror of a vehicle;
   determining a preferred orientation of the mirror based on
   1) a current driver position of a driver of the vehicle,
   2) a difference between a first reference driver position for the driver and a second reference driver position for the driver, wherein the first reference driver position is defined by a first vertical position limit of a driver seat and a first horizontal position limit of the driver seat, and wherein the second reference driver position is defined by a second vertical position limit of the driver seat opposite the first vertical position limit and a second horizontal position limit of the driver seat opposite the first horizontal position limit, and
   3) a difference between a first reference orientation of the mirror when the driver is positioned at the first reference driver position and a second reference orientation when the driver is positioned at the second reference driver position; and
   responsive to determining the current orientation is not the preferred orientation, outputting a command to adjust the mirror to the preferred orientation.

10. The method of claim 9, wherein a field of view of provided by the mirror when the mirror is positioned according to the orientation includes a least threshold portion of a first field of view that is provided by the mirror when the mirror is oriented according to the first reference orientation and the driver is positioned at the first reference driver position and at least the threshold portion of a second field of view that is provided by the mirror when the mirror is oriented according to the second reference orientation and the driver is positioned at the second reference driver position.

11. The method of claim 9, wherein determining the current position of the driver is based on data from one or more of an image sensor or a seat position sensor.

12. The method of claim 9, further comprising:
   identifying the driver; and
   determining, based on identity of the driver, the first reference driver position, the second reference driver position, the first reference orientation, and the second reference orientation.

13. The method of claim 9, further comprising:
   outputting, for display by a display device of the vehicle, a graphical user interface indicating a field of view provided by the mirror; and
   responsive to receiving a user input indicating an updated field of view, adjusting the orientation of the mirror based on the updated field of view.

14. The method of claim 9, wherein the mirror provides a field of view, the method further comprising:
   determining an updated field of view based on a speed of the vehicle; and
   adjusting the orientation of the mirror based on the updated field of view.

15. The method of claim 9, wherein the mirror provides a field of view, the method further comprising:
   responsive to detecting an object behind the vehicle:
      determining an updated field of view that includes the object; and
      adjusting the orientation of the mirror based on the updated field of view.

16. A non-transitory computer-readable storage medium storing instructions that, when executed by one or more processors, cause the one or more processors to:
   determine a current orientation of a mirror of a vehicle;
   determine a preferred orientation of the mirror based on
      1) a current driver position of a driver of the vehicle,
      2) a difference between a first reference driver position for the driver and a second reference driver position for the driver, wherein the first reference driver position is defined by a first vertical position limit of a driver seat and a first horizontal position limit of the driver seat, and wherein the second reference driver position is defined by a second vertical position limit of the driver seat opposite the first vertical position limit and a second horizontal position limit of the driver seat opposite the first horizontal position limit, and
      3) a difference between a first reference orientation of the mirror when the driver is positioned at the first reference driver position and a second reference orientation when the driver is positioned at the second reference driver position; and
   responsive to determining the current orientation is not the preferred orientation, output a command to adjust the mirror to the preferred orientation.

17. The non-transitory computer-readable storage medium of claim 16,
   wherein execution of the instructions further causes the one or more processors to:
      determine an identity of the driver; and
      select, from mirror calibration data for a plurality of drivers, the mirror calibration data associated with the driver matching the identity of the driver.

18. The non-transitory computer-readable storage medium of claim 16, wherein execution of the instructions further causes the one or more processors to:
   output, for display by a display device of the vehicle, a graphical user interface indicating a field of view provided by the mirror; and
   responsive to receiving a user input indicating an updated field of view, adjust the orientation of the mirror based on a second field of view.

\* \* \* \* \*